United States Patent [19]

Sharma et al.

[11] Patent Number: 5,862,519
[45] Date of Patent: Jan. 19, 1999

[54] BLIND CLUSTERING OF DATA WITH APPLICATION TO SPEECH PROCESSING SYSTEMS

[75] Inventors: Manish Sharma, Piscataway; Richard J. Mammone, Bridgewater, both of N.J.

[73] Assignee: T-Netix, Inc., Englewood, Colo.

[21] Appl. No.: 827,562

[22] Filed: Apr. 1, 1997

Related U.S. Application Data

[60] Provisional application No. 60/014,537 Apr. 2, 1996.
[51] Int. Cl.⁶ .................................. G10L 5/06; G10L 9/00
[52] U.S. Cl. ........................ 704/231; 704/243; 704/245; 704/246; 704/247
[58] Field of Search .................................. 704/231, 243, 704/245, 246, 247

[56] References Cited

U.S. PATENT DOCUMENTS 4,802,224  1/1989  Shiraki ................................ 704/231

OTHER PUBLICATIONS

Roucos et al, Segment Quantization for Very Low Rate Speech Quantization, ICASSP82, 1565–1568, May 1982.

*Primary Examiner*—David R. Hudspeth
*Assistant Examiner*—Robert Louis Sax
*Attorney, Agent, or Firm*—Dorsey & Whitney LLP

[57] ABSTRACT

The present invention relates to a method for segmenting speech into subword speech segments. Optimal boundary locations for each estimate of a number of segments are determined within an estimated range of the number of segments. In addition, an optimality criteria is found for each estimate of the number of segments within the range. Using the optimality criteria, the optimal number of subwords are determined. From the location of the boundaries and the optimal number of segments, data can be clustered or speech can be segmented. The method can be used in data processing systems, speaker verification, medium size vocabulary speech recognition systems, language identification systems and coarse subword level speech segmentation processes.

26 Claims, 15 Drawing Sheets

SPEECH SAMPLES
18

Estimate range of the number of subword speech segments ~19

Define an optimality criterion for the number of subword segments ~20

Determine optimal number of segments within range by maximizing optimality criterion ~21

Segment speech for optimal number of segments ~22

Store output of optimal subword boundary locations and optimal number of segments ~23

21

BLIND CLUSTERING OF DATA WITH APPLICATION TO SPEECH PROCESSING SYSTEMS

This application claims the benefit of United States Provisional Application No. 60/014,537 entitled "Blind Speech Segmentation" filed by the applicant on Apr. 2, 1996.

BACKGROUND OF THE INVENTION

1. Field of the Invention:

The present invention relates to a method for processing data into clusters each having a common homogeneity property without prior knowledge of the numbers of clusters and, particularly, to a subword based speaker verification system having the capability of user-selectable passwords which includes segmentation into clusters, such as subwords, without any knowledge of prior linguistic information, and other speech processing systems.

2. Description of the Related Art:

Cluster analysis relates to the entire range of statistical techniques and unsupervised classification methods that group or classify unlabeled data points into clusters. The members within a given cluster exhibit some type of homogeneity properties. The choice of the homogeneity measure results in several different clustering criteria. For example, conventional clustering methods have included an ordinal measure of similarity or dissimilarity between all pairs of objects as described in Helmut Spath "Cluster Analysis Algorithms For Data Reduction And Classification Of Objects", Ellis Horwood Limited, Chichester, England, 1980, Chapter 2, Chapter 6-Sec. 2. Also clustering methods have depended on distributional assumptions about the profile of the given measurements of the objects, as described in Douglas M. Hawkins, "Topics In Applied Multivariate Analysis", Cambridge University Press, Cambridge, England, 1982., Chapter 6, Sec. 4. In some clustering problems, cluster membership has also been restricted under certain criterion such as for segmentation of temporal signals, members of the same cluster can be required to be temporally contiguous, as described in Douglas M. Hawkins, "Topics In Applied Multivariate Analysis", Cambridge University Press, Cambridge, England, 1982., Chapter 6, Sec. 5.

Typically, in automatic speech segmentation, the number of clusters is not known apriori. Hence, the clustering method must determine both the optimal number of clusters and also the proper cluster assignment of the objects. Conventional attempts for determining the number of optimal objects in a cluster have included hierarchial and non-hierarchial techniques. These attempts have the shortcoming of needing prior knowledge of the number of clusters before the objects can be optimally assigned to the cluster.

The objective of a speaker verification system is to verify a claimed identity based on a given speech sample. The speech sample can be text dependent or text independent. Text dependent speaker verification systems identify the speaker after the utterance of a password phrase. The password phrase is chosen during enrollment and the same password is used in subsequent verification. Typically, the password phrase is constrained within a specific vocabulary such as digits. A text independent speaker verification system allows for user selectable passwords. A text independent speaker verification system allows he user to speak freely during training and testing. Accordingly, there are no pre-defined password phrases.

Speech recognition and speaker verification tasks may involve large vocabularies in which the phonetic content of different vocabulary words may overlap substantially. Thus, storing and comparing whole word patterns can be unduly redundant since the constituent sounds of individual words are treated independently regardless of their identifiable similarities. For these reasons, conventional vocabulary speech recognition and speaker verification systems build models based on phonetic subword units.

Conventional text dependent speaker verification systems have used the techniques of Hidden Markov Models (HMM) for modeling speech. For example, subword models, as described in A. E. Rosenberg, C. H. Lee and F. K. Soong, "Subword Unit Talker Verification Using Hidden Markov Models", *Proceedings ICASSP*, pages 269–272 (1990) and whole word models A. E. Rosenberg, C. H. Lee and S. Gokeen, "Connected Word Talker Recognition Using Whole Word Hidden Markov Models", *Proceedings ICASSP*, pages 381–384 (1991) have been considered for speaker verification and speech recognition systems. HHM techniques have the limitation of generally requiring a large amount of data to sufficiently estimate the model parameters.

Other speech modeling attempts use Neural Tree Networks (NTN). The NTN is a hierarchial classifier that combines the properties of decision trees and neural networks, as described in A. Sankar and R. J. Mammone, "Growing and Pruning Neural Tree Networks", *IEEE Transactions on Computers*, C-42:221–229, March 1993. For speaker recognition, training data for the NTN consists of data for the desired speaker and data from other speakers. The NTN partitions feature space into regions that are assigned probabilities which reflect how likely a speaker is to have generated a feature vector that falls within the speaker's region.

The above described modeling techniques rely on speech being segmented into subwords. Traditionally, segmentation and labeling of speech data was performed manually by a trained phonetician using listening and visual cues. There are several disadvantages to this approach. Firstly, this task is extremely tedious and time consuming. Secondly, only a small number of experts have the level of skill and knowledge to achieve reliable labeling of subwords. The combination of the above disadvantages also limit the amount of data that can be labeled in this manner. Thirdly, this manual process involves decisions that are highly subjective which leads to a lack in consistency and reproducibility of results. Also, the above techniques have the drawback of human error.

One solution to the problem of manual speech segmentation is to use automatic speech segmentation procedures. Typical automatic segmentation and labeling procedures use the associated linguistic knowledge, such as the spoken text and/or phonetic string to perform segmentation. In order to incorporate existing acoustic-phonetic knowledge, these procedures generally use bootstrap phoneme models trained from the pre-existing manually labeled speech corpus. Conventional automatic speech segmentation processing has used hierarchical and non-hierarchical approaches.

Hierarchical speech segmentation involves a multi-level, fine-to-coarse segmentation which can be displayed in a tree-like fashion called dendogram; see James R. Glass and Victor W. Zue, *Proceedings of ICASSP*, "Multi-Level Acoustic Segmentation of Continuous Speech", pp. 429–432, 1988 and Victor Zue, James Glass, Michael Phillips and Stephanie Seneff, *Proceedings of ICASSP*, "Acoustic Segmentation and Phonetic Classification in the SUMMIT System pages 389–392, 1989. The initial segmentation is a fine level with the limiting case being a vector equal to one segment. Thereafter, a segment is chosen to be merged with either its left or right neighbor using a similarity measure. This process is repeated until the entire utterance is described by a single segment.

Non-hierarchial speech segmentation attempts to locate the optimal segment boundaries by using a knowledge engineering-based rule set or by extremizing a distortion or score metric. Knowledge engineering-based algorithms have been implemented as a set of knowledge sources that apply rules to speech parameters to locate the segment boundaries and also assign broad phonetic category labels to these segments as described by Ronald Cole and Lily Hou, *Proceedings of ICASSP*, "Segmentation And Broad Classification of Continuous Speech", pp. 453–456, 1988; by Kaichiro Hatazaki, Yasuhiro Komori, Takeshi Kawabata and Kiyohiro Shikano, *Proceedings of ICASSP*, "Phoneme Segmentation Using Spectogram Reading Knowledge", pp. 393–396, 1989 and by David B. Grayden and Michael S. Scordilla, *Proceedings of ICASSP*, "Phonemic Segmentation" of Fluent Speech", pp. 73–76, 1994.

Other attempts of non-hierarchal operator segmentation use dynamic programming based techniques to find the set of optimal segment boundary points that minimize the over-all within segment distortion as described by T. Svendsen and F. Soong, *Proceedings of ICASSP*, "On the Automatic Segmentation of Speech Signals", pp. 3.4.1–3.4.4, 1987 and by Sin-Horng Chen and Wen-Yuan Chen, *IEEE Transactions on Speech and Audio Processing*, "Generalized Minimal Distortion Segmentation For ANN-based Speech Recognition", 3(2):141–145, March 1995. The segmentation is achieved by forced alignment of the given speech sample with its corresponding subword sequence. The above-described conventional techniques for hierarchial and non-hierarchial speech segmentation have the limitation of needing prior knowledge of the number of speech segments and corresponding segment modules.

SUMMARY OF THE INVENTION

Briefly described, the present invention relates to a method for processing data into clusters having a predetermined homogeneity property without prior knowledge of the number of clusters. This method can be defined as "blind" clustering. In the method of blind clustering, the number of clusters is unknown when the clustering is initiated. In the method of blind clustering of the present invention, an estimate of the range of the minimum number of clusters and maximum number of clusters of a data sample is determined. A clustering data sample includes objects having a common homogeneity property. An optimality criterion is defined for the estimated number of clusters. The optimality criterion determines how optimal the fit is for the estimated number of clusters to the given clustering data samples. The optimal number of clusters in the data sample is determined from the optimality criterion.

In particular, the blind clustering method of the present invention can be used in a method and system for segmenting speech without prior knowledge of linguistic information. Speech can be interpreted as quasi-periodic time series data, with vital temporal information. Speech segmentation involves clustering of the speech data into smaller subword speech units, such as phonemes, diphonemes or triphonemes. Contiguity between two data points belonging to the same speech unit is an essential constraint during speech segmentation. Accordingly, the problem of speech segmentation can be viewed as a specialized form of cluster analysis with restrictions on cluster membership.

The segmentation of speech into a number of segments entails finding the change points in the speech such that associated speech vectors are homogenous in some sense. The change points define subword boundaries of the speech. Segmentation of speech without knowledge of linguistic information can be defined as "blind" speech segmentation. The blind speech segmentation method of the present invention includes estimating a range of subword segments in a speech sample. Optimal boundary locations between the segments are determined for each estimation of the number of segments within the range. In addition, an optimality criteria is determined for each estimate of the number of segments in the range. An optimal number of segments is determined by maximizing the optimality criteria. The speech sample is segmented based on the optimal boundary locations between segments and the optimal number of segments.

The estimate of the range of the number of segments can be found by determining a minimum number of segments with a convex hull and a maximum number of segments with a spectral variation function. Preferably, the location of boundaries between segments is dynamically determined with a modified Level Building Dynamic Programming Method for calculating the locations based on a best path between levels representing the number of segments. The optimality criteria can be determined based on a Normal Decomposition Method from a maximum likelihood estimate of speech parameters.

The blind segmentation method of the present invention can be used in a speaker verification system. The blind segmentation method is used to segment an unknown password phrase into subword units. During enrollment in the speaker verification system, the repetition of the speaker's password are used by blind segmentation module to estimate the number of subwords in the password and locate optimal subword boundaries. For each subword segment of the speaker, a subword segmentor model, such as a neural tree network, NTN, is trained. Subword segments from other speakers already enrolled in the system can be used as additional data for discriminant training the classification model. During testing of a speaker's identity, the same spoken password phrase is force aligned into the number of segments determined during training. Using the trained subword segmentor model as a reference model, optimal subword boundaries can be established. A score can be determined from the subword model to make a decision to accept or reject the speaker.

The blind segmentation method can also be used in other speech processing systems, such as midsized speech recognition systems with small to medium user defined vocabulary, language identification systems and coarse subword level segmentation for labeling speech corpus. The invention will be more fully described by reference to the following drawings.

DETAILED DESCRIPTION OF THE PRESENT INVENTION

During the course of this description like numbers will be used to identify like elements according to the different figures which illustrate the invention.

Figure 1:
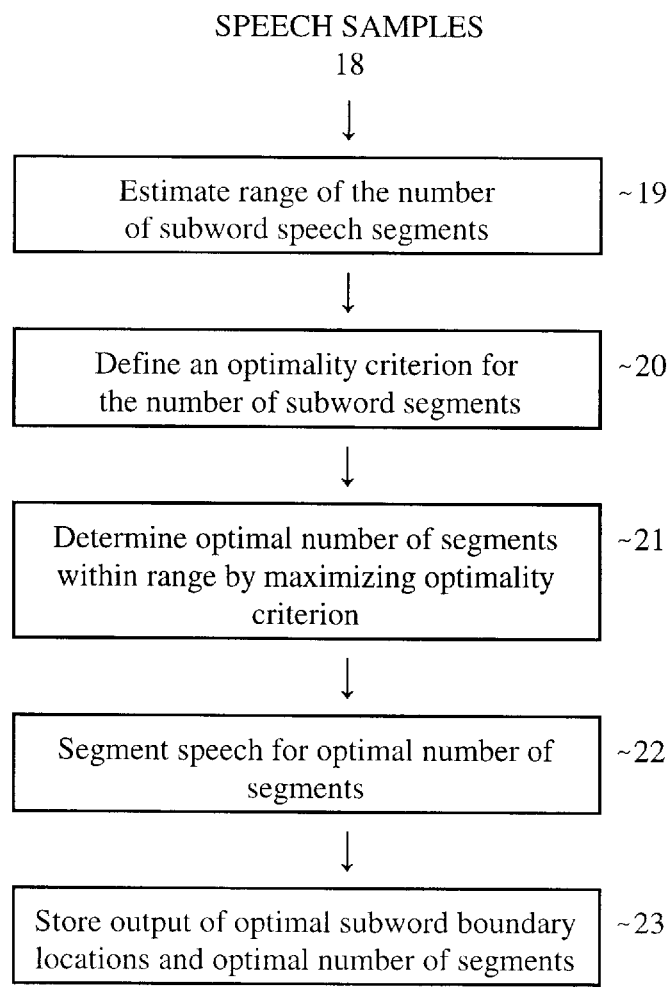
FIG. 1 is a block diagram of a method for blind speech segmentation in accordance with the teachings of the present invention.

FIG. 1 illustrates a flow diagram of a method for blind segmenting speech 15 in accordance with the teachings of the present invention without any linguistic information, for example orthographic or phonetic transcriptions. In block 19, an estimate of a range of the number of segments in speech sample 18 is performed. An estimate of the number of segments is represented by K which falls within the range of the number of segments. The estimate of the range of the expected number of segments provides expeditious segmentation of speech sample 18 by reducing the search range for the optimal number of segments.

The estimate of the range of the number of segments can be defined as being between a minimum number of segments $K_{min}$ and a maximum number of segments $K_{max}$. The minimum number of segments $K_{min}$ can be determined by estimating the number of syllables in speech sample 18, since the number of syllables encompasses a phoneme unit, the number of syllables in the speech sample 18 can represent the lower limit of numbers of segments in speech sample 18. A preferred method for determining the number of syllables is based on a subjective loudness function using the conventional convex hull method as described in Paul Mermelstein Automatic Segmentation Of Speech Into Syllabic Units, *Journal of Acoustical Society of America*, 58(4): 880–883, October 1975.

The convex hull of the loudness function is defined as the minimal magnitude function that is monotonically nondecreasing from the start of the segment to its point of maximum loudness, and is monotonically nonincreasing thereafter. Within the segment, the difference between the convex hull and the loudness function serves as a measure of significance of loudness minima. The point of maximal difference is a point of a potential inter-segment boundary. If the difference at this point exceeds a given threshold, the segment is divided into two sub-segments. Thereafter, segmentation is carried out recursively. The maximum hull-loudness difference in the convex hulls for the newly computed sub-segments cannot exceed that of the original segment. Accordingly, if the maximum hull-loudness difference within a segment is below the threshold, no further segmentation of that segment is possible.

Figure 2:
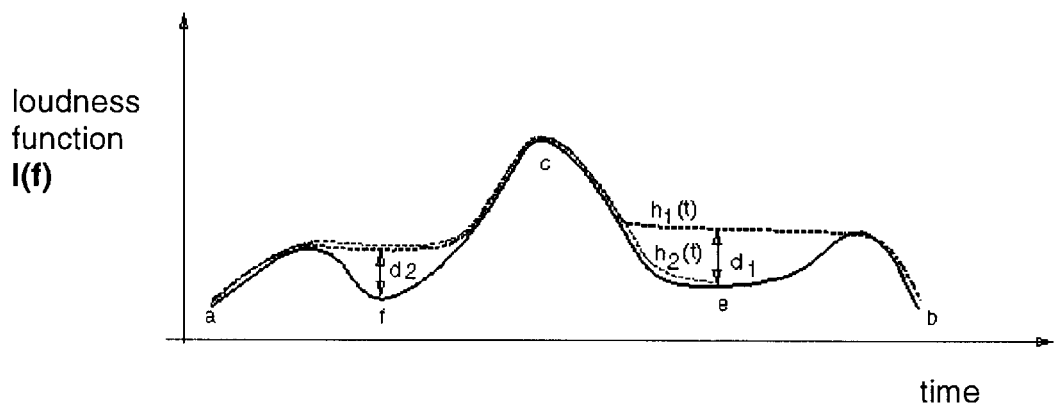
FIG. 2 is a graph of a convex hull method for determining the minimum number of segments in a speech sample.

An illustration of the Convex Hull method is shown in FIG. 2. The original loudness function is shown as a solid line as the curve l(t) for segment a-f-c-e-b. The convex hull over the segment a-f-c-e-b is represented by $h_t(t)$ with a maximum at point c. The maximum hull-loudness difference is $d_1$. If $d_1$ exceeds threshold shown in dotted line segment a-f-c-e-b is cut into segments of a-f-c-e and e-b. The convex hull over e-b follows the loudness function and therefore has zero hull-loudness difference which cannot be segmented further. The convex hull $h_2(t)$ over a-f-c-e has the maximum hull-loudness difference as $d_2$. If $d_2$ exceeds the threshold, then the segment is also segmented into two units. If it is assumed that both $d_1$ and $d_2$ exceed a present threshold, then the speech sample corresponding to loudness function l(t) is subdivided into three segments (i.e., a-f, f-e and e-b).

Alternatively, the minimum number of segments $K_{min}$ can be determined empirically or by other prior knowledge depending on the particular application. The maximum number of segments $K_{max}$ can be preferably determined using a spectral variation function (SVF). The spectral variation function (SVF) is based on the Euclidean norm of delta cepstral coefficient. The cepstral coefficients represent the log of the time-varying, short-time spectrum of speech wherein the time derivative of the cepstral coefficients represent the variation of speech spectrum with time suppose that $c_n(m)$ is the $m^{th}$ cepstral coefficient at time frame n. The time derivative of $c_n(m)$ can be obtained by numerical procedure of first order difference operation. Preferably, an orthogonal polynomial fit is applied to each cepstral coefficient trajectory over a finite length window in order to avoid a noisy estimate from the first order difference operation. Delta cepstral coefficients can be defined as the first order coefficient of the orthogonal polynomial $\Delta c_n(m)$ to represent the spectral slope as follows:

$$\Delta c_n(m) = \frac{\sum_{k=-K^h}^{K} k h_k c_n(m+k)}{\sum_{k=-K^h}^{K} k} \qquad (1)$$

wherein, $h_k$ is a symmetric window of length (2K+1). An example of the window parameters is $h_k=[-2,-1,0,1,2]$ for k=2.

The frame-to-frame spectral variation function (SVF) can be approximated by a parameter generated using the delta cepstral coefficients as follows:

$$SVF_{\Delta cep}(n) = \sum_{m=1}^{p} [\Delta c_n(m)]^2 \qquad (2)$$

wherein, p is the order of the cepstral coefficient vector.

The function $SVF_{\Delta cep}(n)$ exhibits peaks at boundaries between speech sounds such as phonemes, where the spectral characteristics of speech change rapidly. The speech sound boundaries can then be located by choosing local peaks in the trajectory of $SVF_{\Delta cep}(n)$ over time. Depending on the criterion used to define a local peak in the SVF$_{\Delta cep}$(n) trajectory, small and spurious peaks can be located which produce more segment boundaries than are actually present in the speech sample. Accordingly, the maximum number of segments K$_{max}$ will be greater than the expected value of optimal umber of segments K$_0$.

Figure 3:
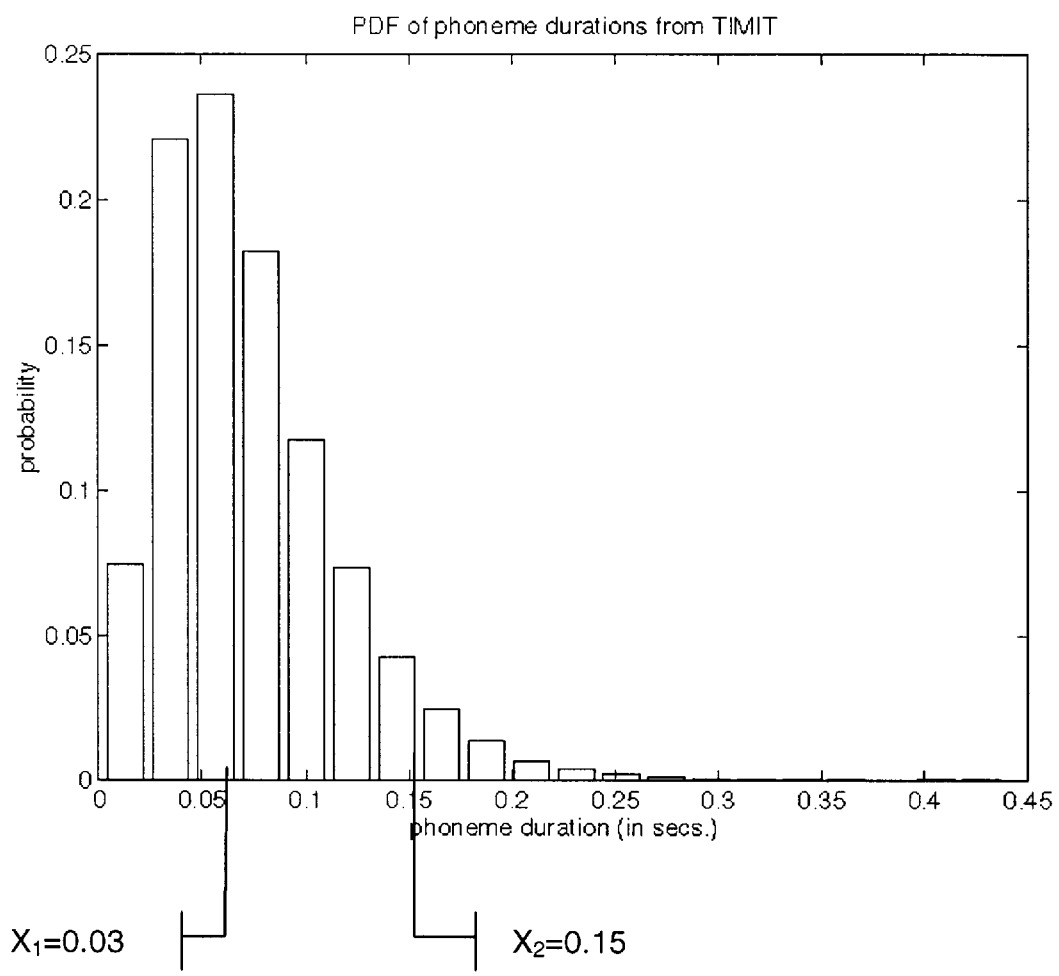
FIG. 3 is a plot of a histogram for phoneme duration of a conventional NIST distributed speaker data called TIMIT database.

Alternatively, the average phoneme duration for a phonetically labeled database, such as the National Institute of Standards and Technology, (NIST) database called TIMIT, can be used for estimating the minimum number of segments K$_{min}$ and the maximum number of segments K$_{max}$. A sample histogram of the phoneme duration for the TIMIT database is plotted in FIG. 3. Points x$_1$ and x$_2$ represent leveling off of the histogram at 30 msec and 150 msec, respectively. For a one second duration of a speech sample 16, the minimum number of segments K$_{min}$ can be calculated as 1/0.150 secs or approximately 6 and the segments maximum number of segments K$_{max}$ can be calculated as 1/0.03 secs or approximately 33 segments. It will be appreciated that other known phonetically labeled databases could be used with the teachings of the present invention.

In block 20 of FIG. 1, an optimality criterion for the number of subword segments is determined. In block 21, an optimal number of segments K$_0$ within the range of the number of segments K$_{min}$ to K$_{max}$ is determined for speech sample 18 by maximizing the optimality criterion. From the optimal number of segments K$_0$, speech sample 16 is segmented in block 22 into smaller speech units on the basis of homogeneity criteria. The output of the method for segmenting speech is the optimal number of subword segments and their optimal boundary locations which can be stored for later use, as shown in block 23.

Figure 4:
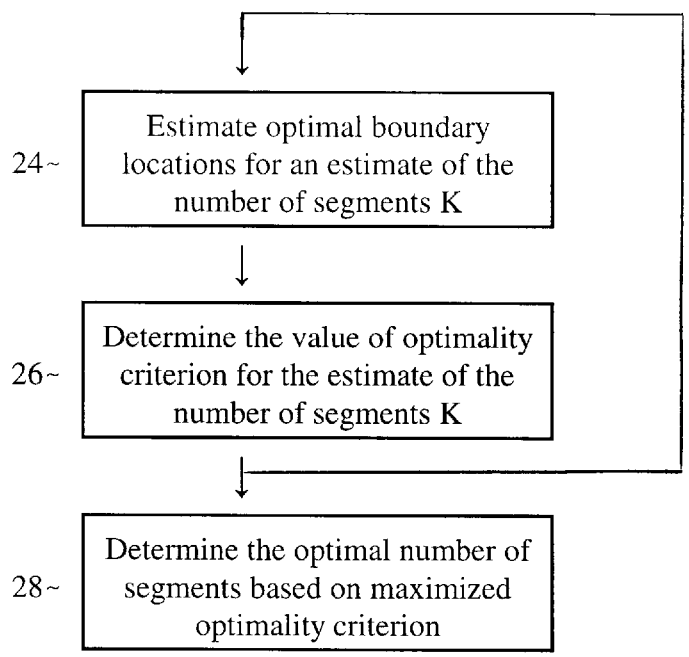
FIG. 4 is a block diagram of the method for determining the optimal number of segments.

FIG. 4 illustrates a block diagram of block 21 for determining the optimal number of segments K$_0$ within the range between the minimum number of segments K$_{min}$ and the maximum number of segments K$_{max}$. A determination of the optimal locations of speech segment boundaries for each estimated number of segments K in the range between the minimum number of segments K$_{min}$ and the maximum number of segments K$_{max}$ is determined in block 24 For each estimated number of segments K there will be K−1 optimal location of speech segment boundaries. An optimal location of speech segment boundaries is defined as a point which minimizes the overall intra-segment distortion between speech segments in speech sample 11. A Modified Level Building Dynamic programming technique can be used in block 24 for estimating the optimal locations of speech segment boundaries. Each value of the number of boundary locations is represented by a level counter l which is between 1 and the maximum number of levels, L corresponds to the maximum number of boundaries, N. N is the total number of data samples. In the method for blind segmenting speech 17, a speech sample can be a raw speech waveform which can be converted into spectral feature so that N is the total number of vectors. A local distance d$_l$(i,n) is the local distance of the l$^{th}$ level when frames i through n are classified in segment l and can be determined with the distance from the cluster mean so that $$d_l(i, n) = \sum_{j=1}^{j=n} \|x_j - M_{i,n}\|^2 \ (i < n) \quad (3)$$

where $\|x\|$ stands for the Euclidian norm of vector x, and M$_{i,n}$ is the mean vector of frames i through n, given by $$M_{i,n} = \frac{1}{n - i + 1} \sum_{j=i}^{j=n} x_j.$$

Figure 5:
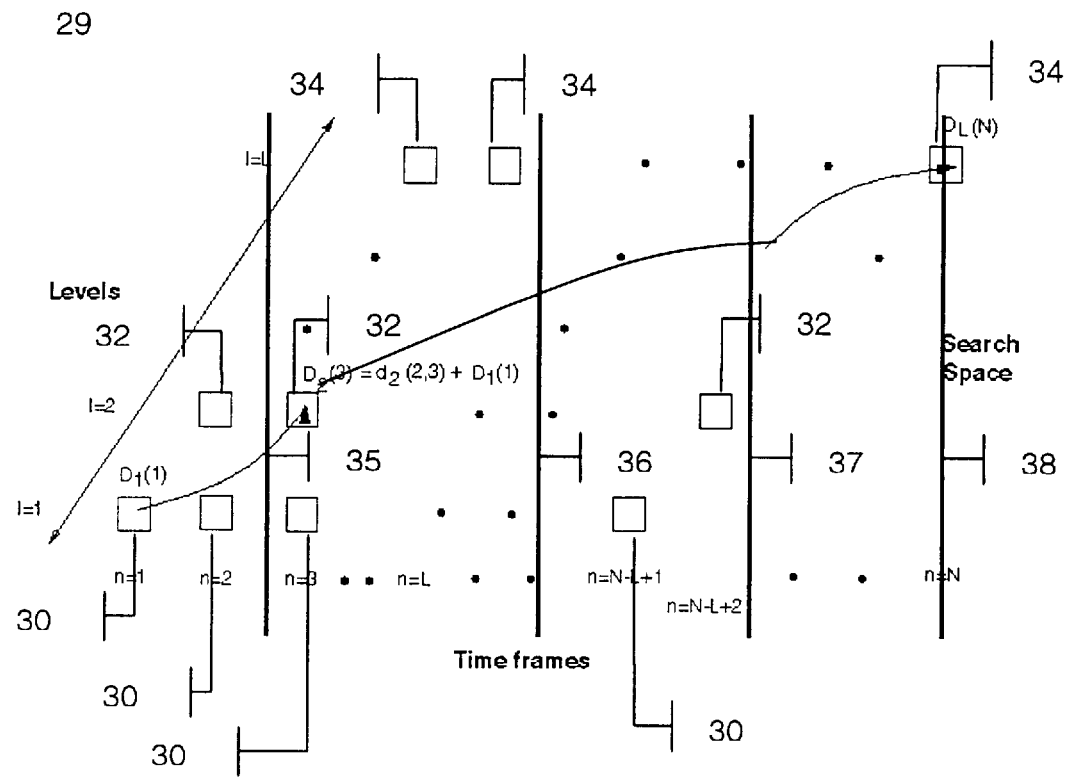
FIG. 5 is a schematic diagram of a level building dynamic programming method for determining the optimal number of segments.

FIG. 5 illustrates an example of the Modified Level Building Dynamic Programming technique (MLBDP). For level l=1, an accumulated distance D$_1$(n) at the l'th level and nth frame corresponds to $$D_l(n) = d_l(l,n) \quad (4)$$

For level 1, the spectral frame counter n can be defined as n=1 to (N−L+1). The accumulated distances D$_l$(n) for frames n to N−L+1 level 1 are represented by blocks 30. A backtrack pointer B$_l$(n) at the l$^{th}$ level and n$^{th}$ frame, corresponds to the best path for locating the optimal l segment boundaries ending at frame n and can be represented for level 1 by:

$$B_l(n) = 1.$$

Thereafter, for the second level (l=2) to the next to the last levels (L−1) the accumulated distance can be represented as $$D_l(n) = min_i\{d_l(i+1, n) + D_{l-1}(i)\} \ (i<n) \ n=l \text{ to } (N-L+l). \quad (5)$$

Min$_i$ represents the minimum for all ranges of i, frame l is less than n and n is between l and N−L+l.

The backtrack pointer can be represented as:

$$B_l(n) = arg \ min_i\{d_l(i+1,N) + D_{l-1}(i)\} \quad (6)$$

The backtrack pointer B$_l$(n) represents the value of i at which the argument is the minimum which is the best path between the accumulated distance for level 2 of D$_2$(n) to the accumulated distance for level 1 of D$_1$(n) for the frame number n.

For example for the second level l=2 at n=3 the accumulated distance can be represented by D$_2$(3)=d$_2$(2,3)+D$_1$(1). The accumulated distances for level 2 of D$_2$(n) are represented by blocks 32.

For the last level l=L the accumulated distance can be represented by:

$$D_l(n) = min_i\{d_l(i+1,n) + D_{l-1}(i)\} \quad (7)$$

for (i<N), for frame i is smaller than the maximum number of frames N and the backtrack pointer can be represented by:

$$B_l(n) = arg \ min_i\{d_l(i+1,N) + D_{l-1}(i)\} \quad (8)$$

The accumulated distance D$_L$(n) is represented by blocks 34. For example, from the back-track pointer the optimal location of speech segment boundaries for an estimated number of segments K are represented at locations 35, 36, 37 and 38.

For each estimate of the number of segments K an optimal criteria is Q$_k$ is determined in block 26 of FIG. 4. The optimal criteria Q$_k$ can be determined using a Normal Decomposition method which has been described by K. Fukunaga, *Introduction of Statistical Pattern Recognition*, Academic Press, Chapter 11, San Diego, 1990. The complex distribution of all the input speech observation vectors in speech sample 16 can be approximated by the summation of several normal-like distributions described as distribution p(x). The distribution p(x) of the estimate of the number of segments K can be described as:

$$p(x) = \sum_{i=1}^{i=K} P_i p_i(x) \quad (9)$$

wherein $P_i$ is the prior probability, and $p_i(x)=(x,M,\Sigma_i)$ is normal with expected vector $M_i$ and covariance matrix $\Sigma_i$.

A maximum likelihood (ML) estimate of the parameters can be obtained by maximizing $$\prod_{j=1}^{N} p(x_j)$$

with respect to $P_i$, $M_i$ and $\Sigma_i$ under the constraint $$\sum_{i=1}^{K} P_i = 1$$

The ML estimations are as follows:

$$P_i = \frac{1}{N} \sum_{j=1}^{N} q_i(x_j) \; (1 \leq i \leq K) \quad (10)$$

$$M_i = \frac{1}{N_i} \sum_{j=1}^{N} q_i(x_j) x_j \quad (11)$$

wherein $$q_i(x) = \frac{P_i p_i(x)}{P(x)}$$

is the posteriori probability of the $i^{th}$ normal mixture.

$$\Sigma_i = \frac{1}{N} \sum_{j=1}^{N} q_i(x_j)(x_j - M_i)(x_j - M_i)^T \quad (12)$$

Using the optimal location of segmentation boundaries obtained from block 24, maximum likelihood, ML estimates of $P_i$, $M_i$ and $\Sigma_i$ are computed using equations (10), (11) and (12) respectively. Initial values of the parameters $P_i$, $M_i$ and $\Sigma_i$ are determined by speech data vectors belong the $i^{th}$-segment to estimate the initial parameters of the $i^{th}$ normal distribution.

An optimal criterion based on 10 g likelihood measurement is then defined by:

$$Q_K = \sum_{j=1}^{j=n} \ln p(x_j) \quad (13)$$

$$Q_k = \sum_{j=1}^{j=N} \ln\left( \sum_{i=1}^{k} P_i\left( x_j, M_i \Sigma_i \right) \right) \quad (14)$$

$$Q_k = \sum_{j=1}^{j=N} \ln\left( \sum_{i=1}^{K} P_i p_i(x_j) \right) \quad (15)$$

$Q_k$ can be used to determine the optimal number of segments, $K_0$. A maximized optimal criterion value $Q_k$ is obtained for the estimated number of clusters K.

Blocks 24 and 26 are repeated for all values of the estimate of the number of segments K between $K_{min}$ and $K_{max}$. An advantageous optimality criterion $Q_k$, as described above, increases as the estimate of the number of segments K increases and reaches a flat plateau at the optimal number of segments, $K_0$. $Q_k$ can decrease beyond $K_0$ due to estimation errors. Accordingly, even if more normal distributions are determined, the mixture distribution cannot be better approximated. In block 28, the optimal number of segments is determined based on the optimality criteria.

Figure 6A:
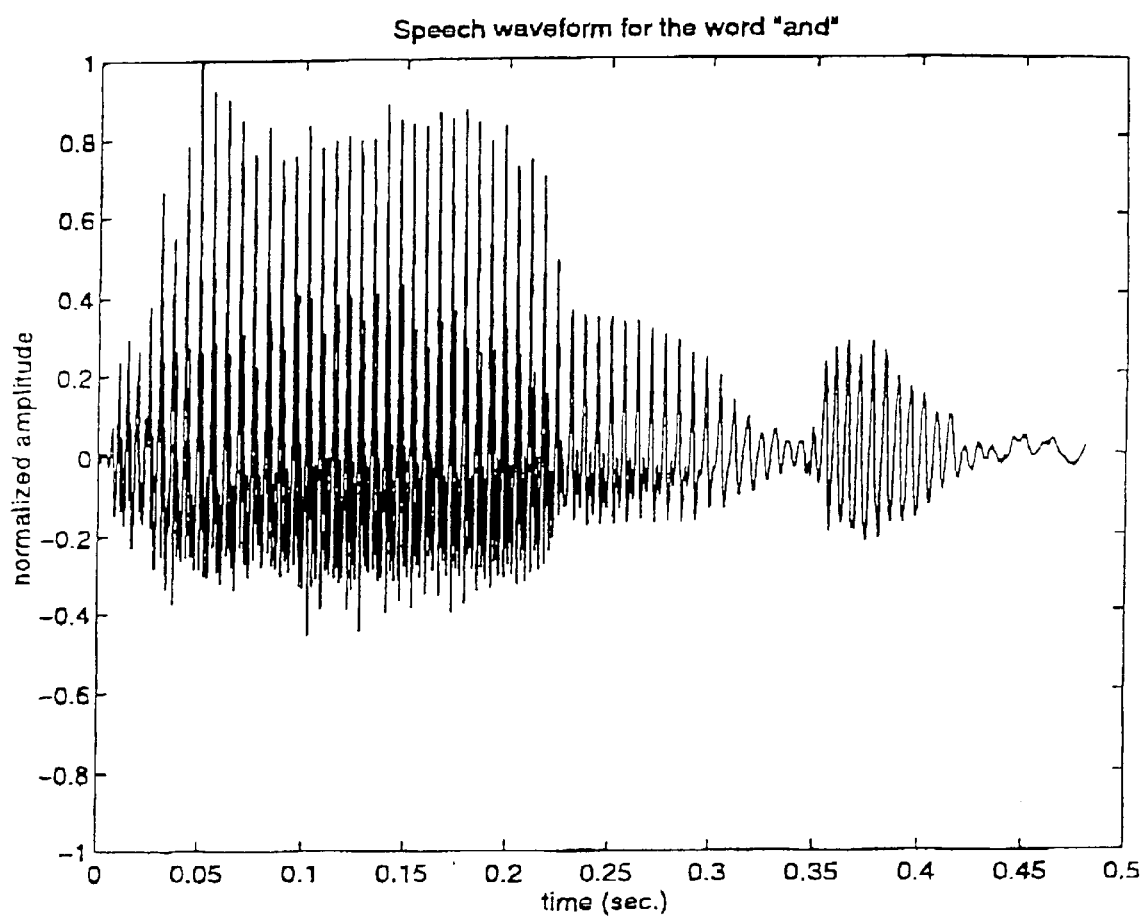
FIG. 6A is a diagram of a speech wave form representing a speech segmenting example.
Figure 6B:
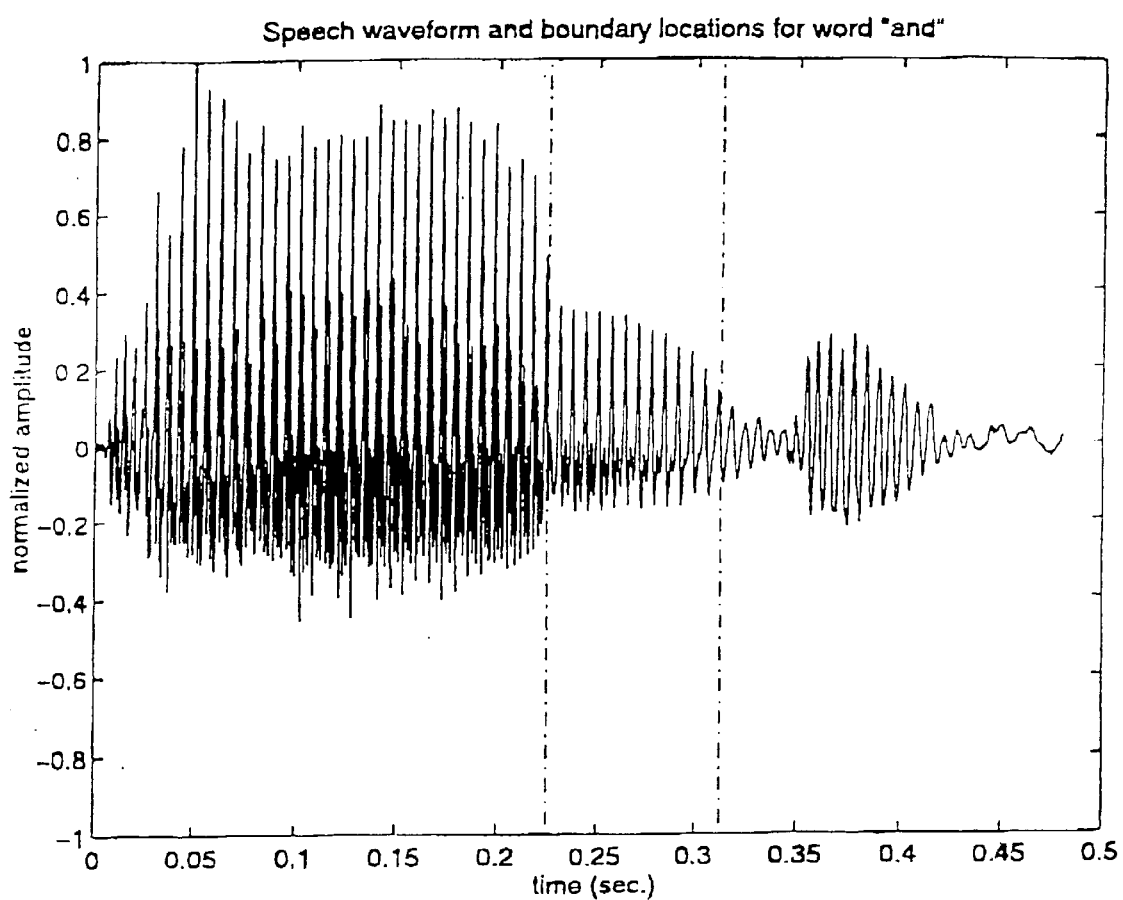
FIG. 6B is a diagram of boundary locations for the speech wave form shown in FIG. 6A.
Figure 6C:
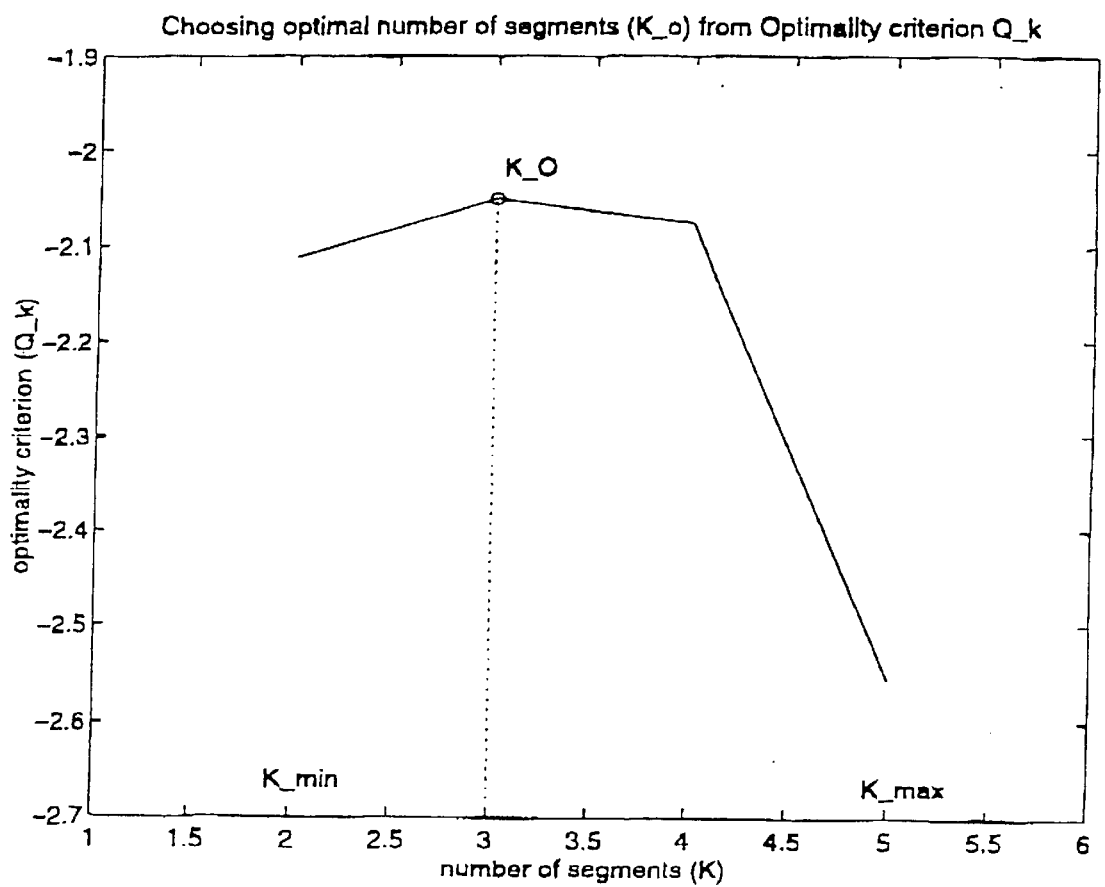
FIG. 6C is a plot of the optimality criterion in relation to the number of segments for the speech wave form shown in FIG. 6A.

An example of the determination of determining the optimal number of segments of a speech sample shown in FIGS. 6A–6C.

FIG. 6A illustrates a speech waveform for the word "and". The normalized amplitude of the speech sample is plotted against the duration in time. FIG. 6B illustrates the boundary locations which minimize the overall intra segment distortions in the speech sample shown in FIG. 6A for the optimal number of segments 23 determined from optimality criterion $Q_k$. FIG. 6C illustrates a determination of an optimal number of segments $K_0$ from an optimality criterion $Q_k$ which was determined with equations 13.

Figure 7:
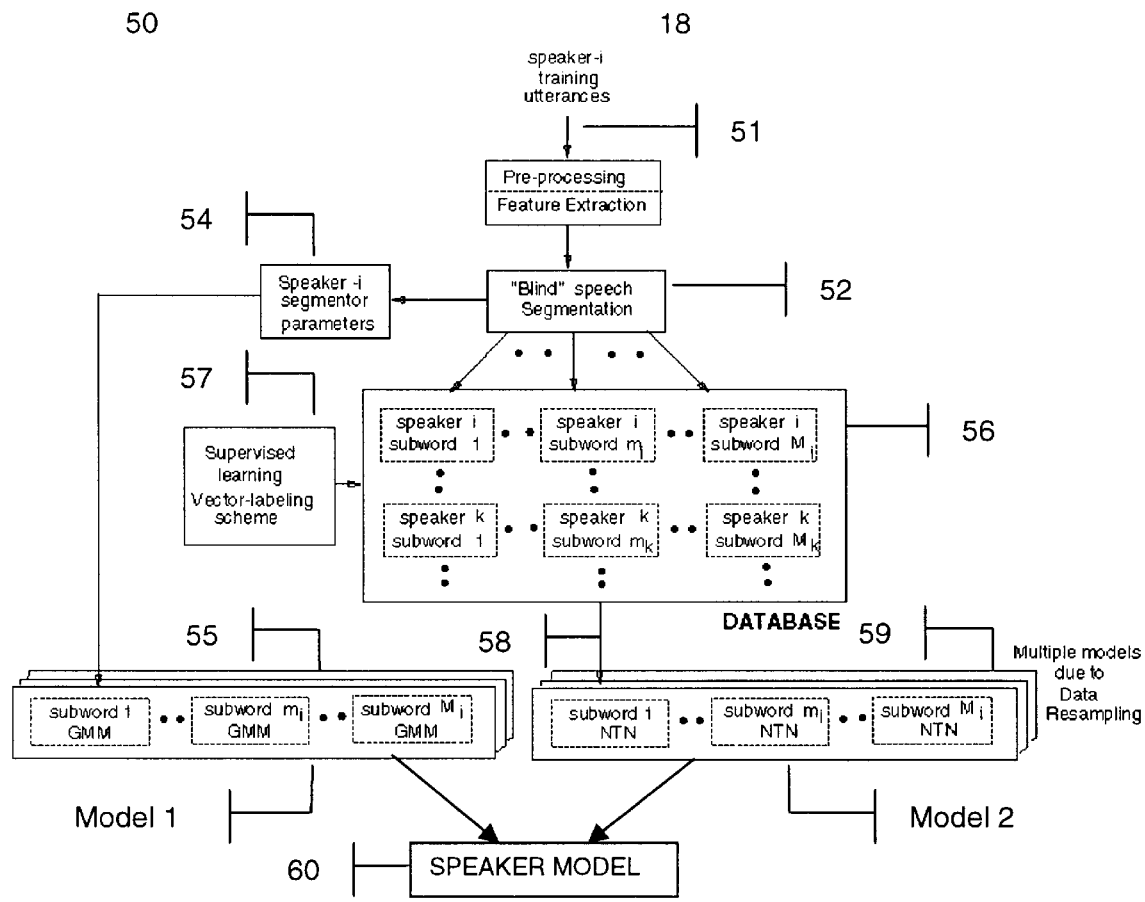
FIG. 7 is a schematic diagram of a speaker verification system during enrollment of the speaker in accordance with the teachings of the present invention.

FIG. 7 illustrates a schematic diagram of a preferred embodiment of speaker verification system 50 during training in accordance with the teachings of the present invention. A speaker utters speech sample 18 as training utterance. Preferably, speech sample 18 is a user selectable password and the orthographical transcription (i.e., text) of the password is unavailable. Speech sample 18 is applied as a speech signal to pre-processing and feature extraction module 51 for converting the speech signal into spectral feature vectors. The pre-processing includes analog to digital conversion of the speech signal. The analog to digital conversion can be performed with standard telephony boards such as those manufactured by Dialogic as Model #D-41. A speech encoding method such as ITU G711 standard $\mu$ law can be used to encode the speech samples. Preferably, a sampling rate of 8000 Hz is used. In an exemplary embodiment, the computer processing unit is a Pentium platform general purpose computer processing unit, CPU manufactured by Intel having about 10 MB associated RAM memory and a hard or fixed drive as storage. Pre-processing can include mean removal of the DC offset in the signal and pre-emphasis to normalize the spectral tilt in the speech spectrum. Background silence in the speech signal can be removed using conventional methods such as speech and silence discrimination techniques using energy and/or zero crossings. Thereafter, the pre-processed speech signal is Hamming windowed and analyzed; for example in 30 millisecond analysis frames with 10 millisecond shift between consecutive frames. Spectral features are represented by speech feature vectors determined within each frame of the processed speech signal. Spectral feature vectors can be obtained with conventional methods such as linear predictive (LP) analysis to determine LP cepstral coefficients, Fourier Transform Analysis and filter bank analysis. A preferred method for obtaining spectral feature vectors is a 12th order LP analysis to determine 12 cepstral coefficients.

Multiple repetitions of the user selectable password are used by blind speech segmentation module 52 to estimate the number of subwords in the password and locate the optimal subword boundaries. Blind speech segmentation module 52 uses the method for blind segmenting speech 15 described above for determining the optimal number of segments and locating corresponding subword boundaries in speech sample 16. The optimal number of subwords for the given password is estimated by using the optimality criterion $Q_k$ described in equation (13) using the Normal decomposition method as discussed above. For any given estimate of the number of subwords, the maximum likelihood value of the normal decomposition parameters are estimated by equations 10–12 using subword boundaries obtained from the Modified Level-building Dynamic programming-based segmentation procedure described above and as illustrated in FIG. 5.

From the optimal number of subwords and locations of subword boundaries a reference template of speech sample 18 is generated and is stored in module 54. A mean vector and co-variance matrix can also be determined from the subword segmented data and can be stored as speaker segment parameters in module 55. A subword model, such as a Gaussion mixture model, GMM, can be generated with the mean vector and co-variance matrix in module subword module 55 to become a part of the speaker model.

In the preferred embodiment of speaker verification system 50, a discriminant-based classifier is used for classifying subword speaker data. A discrimination based pattern classifier is trained to learn to classify/recognize the pattern of a given class by giving it exemplars of the class itself and exemplars of anti-class, i.e., not in the class. For example, a neural tree network (NTN), as described in A. Sankar and R. J. Mammone, "Growing and Pruning Neural Tree Networks", *IEEE Transactions on Computers*, C-42:221–229, March 1993 can be used as the discriminant based classifier. Segmented subword speech data from module 52 is registered in database module 56 to be used in training of the discriminant based classifier for the speaker and for training the discriminant based classifier for other speakers that are subsequently trained.

Database 56 is labeled with speaker and subword labels. Due to the lack of linguistic information for speech sample 18, no linguistic label is available for the subword speaker data. Accordingly, subword segments of speaker "i" are labeled from 1 through $M_i$, where $M_i$ is equal to the optimal number of subword segments determined by blind segmentation module 52.

For training of a discriminant based classifier, anti-class exemplars of speech as data from speakers other than the one being trained are used in supervised learning vector labeling module 57. Supervised learning vector labeling module 57 searches database 56 for the closest subword data for other speakers as anticlass exemplars to train the discriminant based classifier for each subword of the speaker. Learning vector labeling module 57, logically labels the subword feature vectors of the training speaker as "1" and the subword feature vectors of the other speakers as "0". The labeled feature vectors are used to train a discriminant based classifier model 59 for the subword of the training speaker. This training procedure is repeated for all the subwords of the speaker to generate discriminant based classifier model 59 for the speaker. Preferably, discriminant based classifier model 59 is an NTN model. Subword model 55 and discriminant based classifier model 59 collectively form speaker model 60. Multiple subword models 55 and discriminant based classifier models 59 can be generated to form multiple speaker models 60 using multiple repetitions of the speaker's speech sample 18. The Blind segmentation module 52, class segmentation subword model module 55, supervised learning labeling module 57, and discriminant based classifier model 59 can be implemented in the C programming language for execution on the CPU using the Unix operating system. The database and the application software can be stored in the computer platform.

Figure 8:
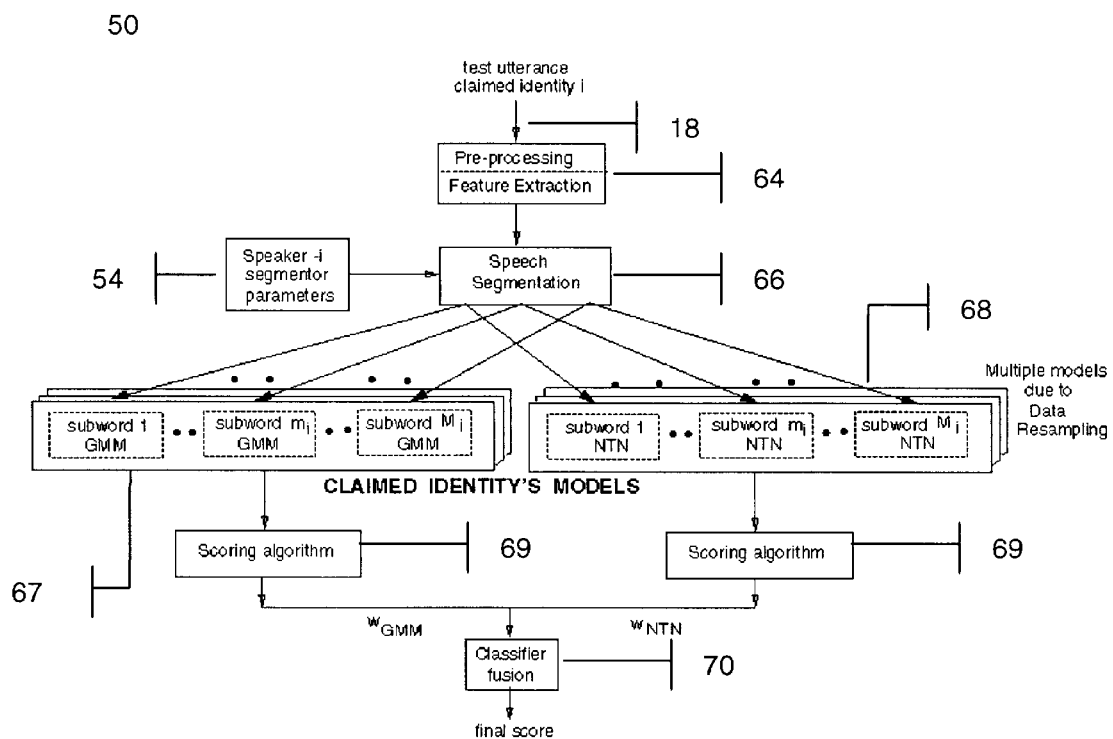
FIG. 8 is a schematic diagram of the speaker verification system as shown in FIG. 8 during testing of a speaker's identity.

FIG. 8 is a schematic diagram of speaker verification system 50 during testing of a claimed identity. Speech sample 61 is a test utterance and has the same content as the training utterance that was used during training in FIG. 7. Speech sample 16 is applied as a speech signal to a pre-processing spectral feature extraction module 64. Pre-processing and spectral feature extraction module 64 performs similar pre-processing and feature extraction as was performed in pre-processing and spectral feature extraction module 51. In module 66, speech segmentation is performed with speech segmentation parameters of the optimal number of segments determined in module 54 for force segmenting speech sample 16 into the optimal number of segments determined during training. Using the subword models generated in module 54 as reference models, a Viterbi or a Dynamic programming (DP)-based algorithm can be used to locate the optimal subword boundaries. The DP algorithm finds the optimal association of a test vector with a subword segment, so as to maximize the accumulated score of the test vectors with their corresponding modeled segment.

A first modeling module 67 and a second modeling module 68 are applied to the segmented subword speech data generated by speech segmentation module 66. For example, first modeling module 67 can be Gaussion mixture model and second modeling module 68 can be a NTN model. First modeling module 67 and second modeling module 68 each determine a score for each spectral vector of a subword segment in block 69. First modeling module 67 corresponds to trained modeling module 55 and second modeling module 68 corresponds to trained modeling module 59. Multiple models for each subword can exist in first modeling module 67 and second modeling module 68 if data resampling was used during training the model. The scores of the first modeling module 67 and second modeling module 68 are combined respectively to obtain a composite score for the entire speech sample phrase in the corresponding block 69. The output score of the subword models can be averaged with the following techniques: averaging over all the vectors for the entire phrase; average of the score of vectors within a subword, before averaging the subword scores; and averaging the score of vectors within a subword and weighting the subword score in the final averaging. The phrase level scores from first modeling module 67 and second modeling module 68 obtained in blocks 69 are fused together in module 70 to obtain a composite score corresponding to the test speech sample 61. If the determined score is above a predetermined value, the speaker will be accepted and if the score is below the predetermined value, the speaker will be rejected.

The above described method for blind segmenting speech 15 can also be used for obtaining sub-word level segmentation in small to medium size vocabulary speech recognition systems, for example vocabulary speech recognition systems having about 10 to about a few hundred vocabulary words with a user defined vocabulary. An example of small to medium size vocabulary speech recognition system is a voice dialing telephony application in which the vocabulary can be the names of individual callers which can be automatically dialed after the individual caller's name is uttered to the system.

Figure 9:
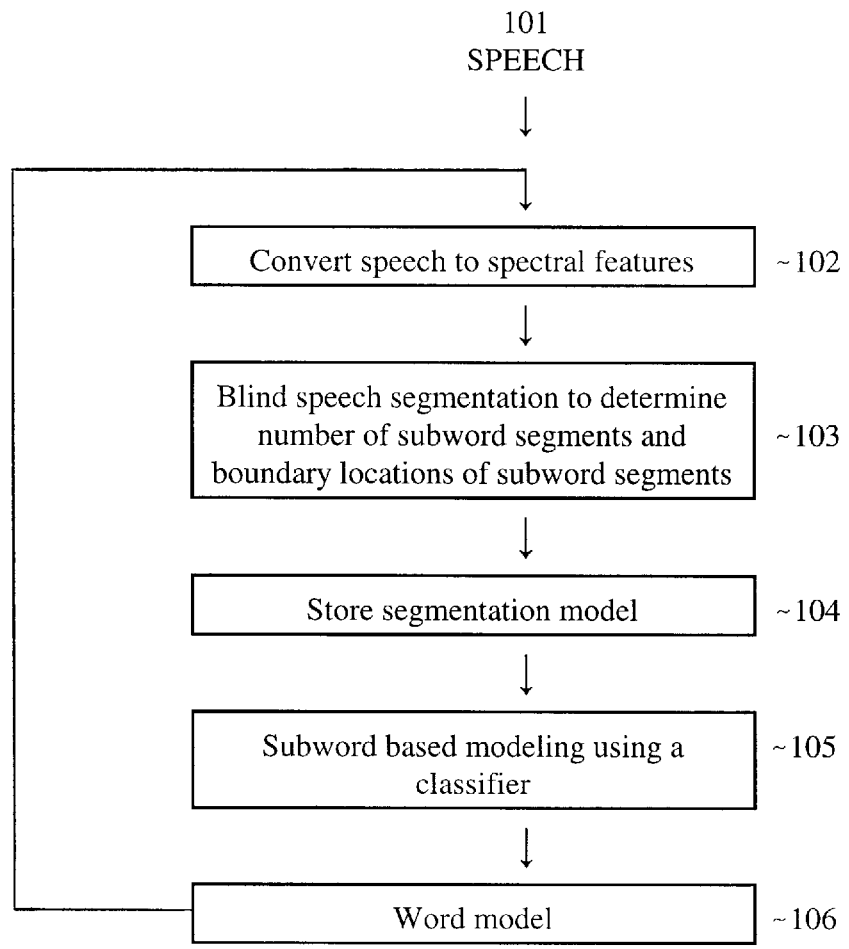
FIG. 9 is a schematic diagram of a small to medium size vocabulary speech recognition system during training mode.

FIG. 9 illustrates a schematic diagram of system for speech recognition 100 during training. System for speech recognition 100 can be used to determine the content of spoken words, for example as conversion from speech to text for use as commands to a computer system. Speech sample 101 is converted to spectral feature vectors in module 102. Blind speech segmentation module 103 segments a vocabulary word using the method for blind segmenting speech 15 to determine the number of subword segments and the boundary locations of the subword segments. The parameters of the method for blind segmenting speech 15 are stored in module 104. In module 105, subword based modeling is performed using a classifier, such as a GMM classifier, an NTN classifier or the combination of a GMM classifier and NTN classifier. A word model which can be used in the system for speech recognition 100 is determined in module 106. The steps can be repeated for generating word models of all vocabulary words used in the system for speech recognition 100.

Figure 10:
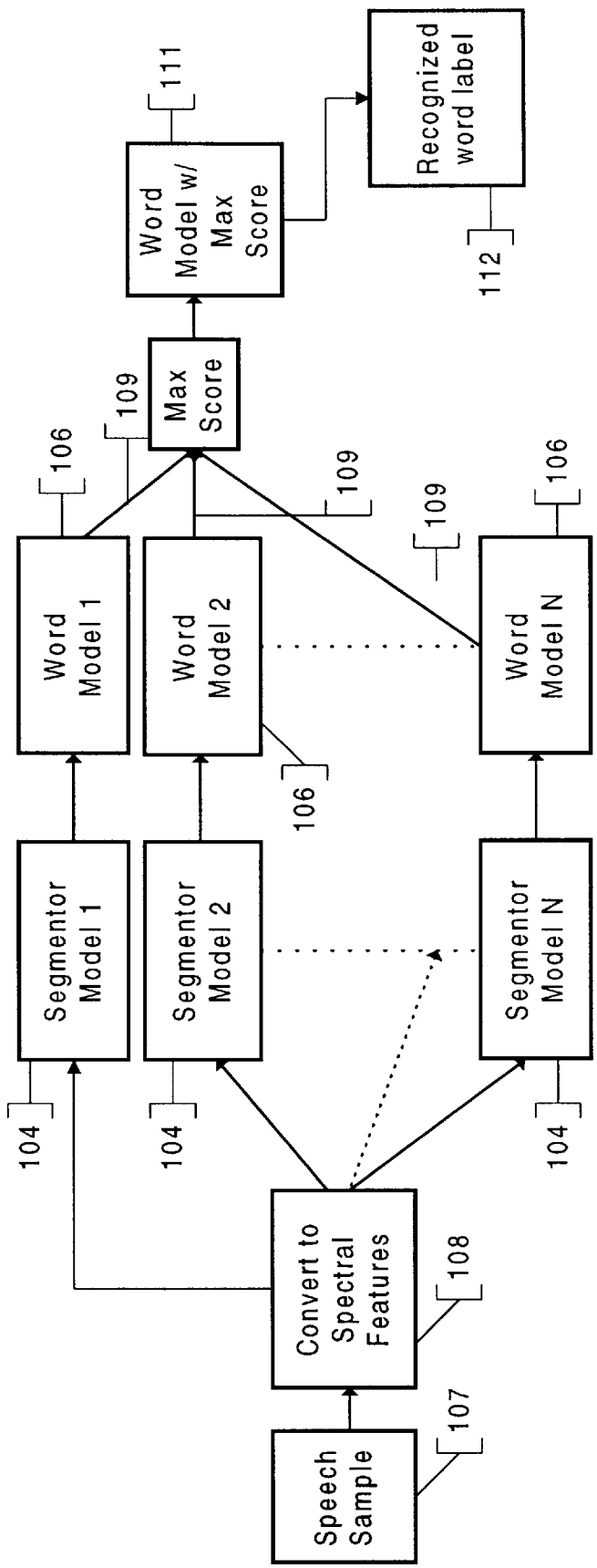
FIG. 10 is a schematic diagram of a small to medium size vocabulary speech recognition system during operation mode.

FIG. 10 illustrates the above-described trained speech recognition system 100 during operation. Speech sample 107 to be recognized, is converted to spectral feature vectors in module 108 using the feature vector speech sample 107 is segmented into subword segments using the segmentation parameters 103 stored during training in module 104. The segmented subword data is applied to word models (1,2 . . . N) 106 for vocabulary words 1 through N. Maximum score module 110 receives a score 109 for each of the word models (1–N) 106 and determines the word model 111 with the highest score. Recognized word label module 112 outputs the word label of subword word model 111 having the determined highest score from maximum score module 110.

The above described method for blind segmenting speech 15 can also be used in language identification systems to obtain segmentation of untranscribed multi-language speech. A language identification system determines which language is being spoken by a user, for example, English, French or Japanese. The identification of language can be used in systems such as a 911 emergency system or customer service to determine the language being spoken by a user of the system in order to appropriately direct further processing of the call.

Figure 11:
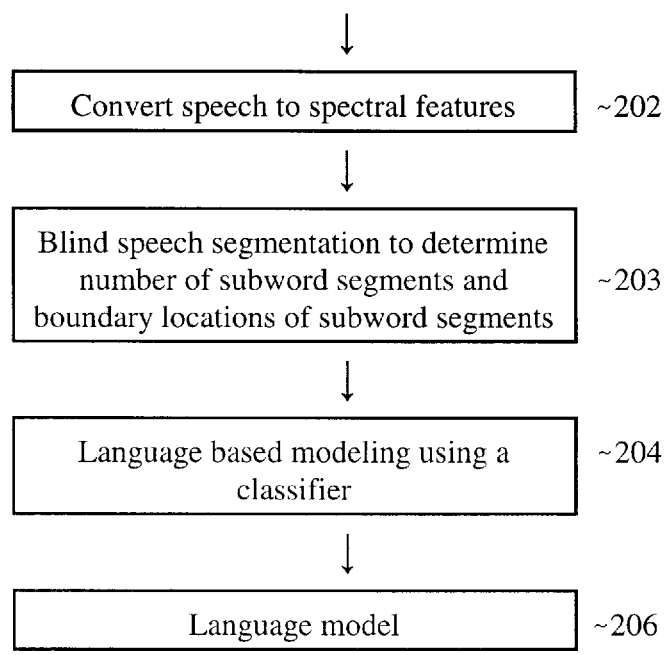
FIG. 11 is a schematic diagram of a language identification system during training mode.

FIG. 11 illustrates a schematic diagram of a language identification system 200 during training. Module 202 converts language speech sample 201 to spectral feature vectors. Blind speech segmentation module 203 segments the spectral feature vectors using the method for blind segmenting 15 to determine the number of subword segments and the boundary locations of the subword segments. In module 204, language based modeling is performed using a pattern classifier, such as a GMM classifier or an NTN classifier. A language model which can be used in a language identification system is generated in module 206. A model, such as was generated in module 206, is generated for each language to be recognized with language identification system 200.

Figure 12:
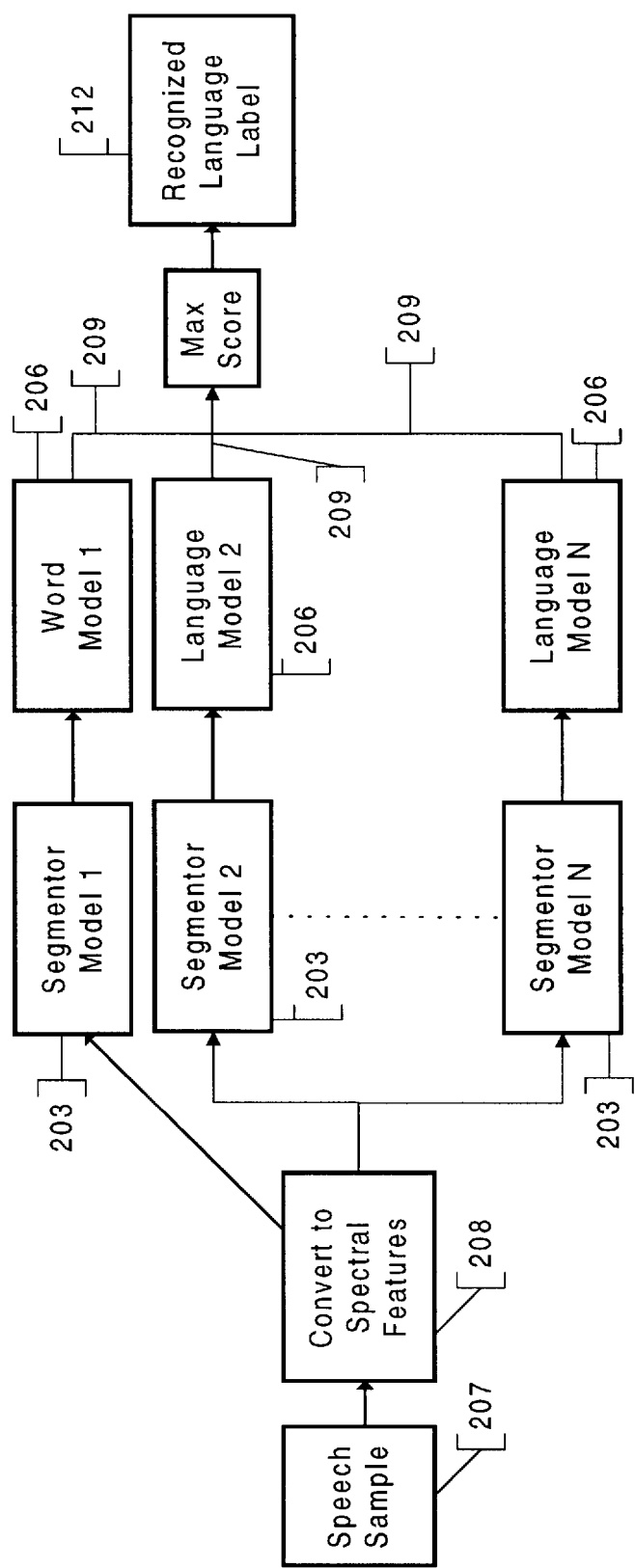
FIG. 12 is a schematic diagram of a language identification system during operation mode.

FIG. 12 illustrates language identification system 200 during operation. Speech sample 207 to be recognized is converted into spectral feature vectors with module 208 and is applied to language models (1,2 . . . N) 206 which were determined during training for 1 to N languages. Maximum score module 210 receives score 209 for each of the language models (1 to N) 206 and determines the word model 206 with the highest score. Recognized language label module 212 outputs a language label of the language model (1 to N) 106 having the determined highest score from maximum score language module 210.

The above described method for blind speech segmenting 15 can also be used in obtaining a "coarse", subword level segmentation on newly acquired speech corpora which can be used as seed values to aid the subsequent manual process of phonetic transcription.

Figure 13:
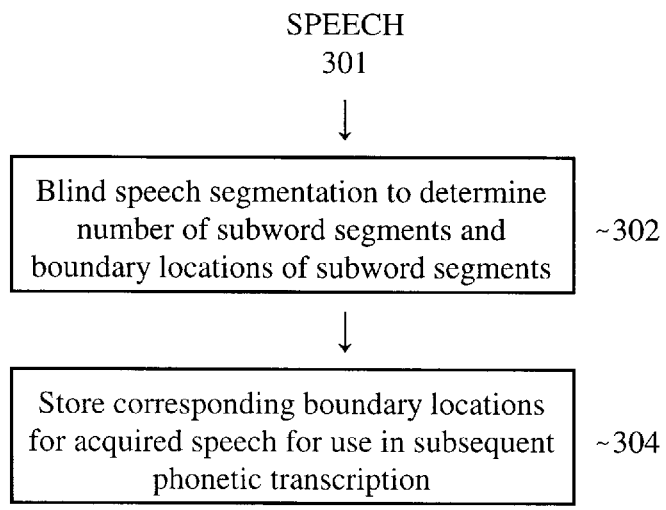
FIG. 13 is a schematic diagram of a system for course subword level segmentation to be used in the subsequent manual process of phonetic transcription.

FIG. 13 illustrates coarse subword level segmentation system 300. Blind speech segmentation module 302 a determines the number of subword segments and the boundary locations of the subword segments. In module 304, the determined boundary locations are stored for use in subsequent phonetic transcription.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A method for segmenting speech without knowledge of linguistic information into a plurality of segments comprising the steps of:

estimating a range of a number of said segments in said speech;

dynamically determining locations of boundaries for each estimate of a number of said segments K within said range of said number of said segments;

determining an optimality criterion $Q_k$ for each of said estimate of said number of segments K from said location of said boundaries;

determining an optimal number of segments $K_0$ in said speech from said optimality criterion $Q_k$;

segmenting said speech into said optimal number of segments $K_0$; and storing said optimal number of segments $K_0$.

2. The method of claim 1 wherein said range of said number of segments is between a minimum number of segments $K_{min}$ and a maximum number of segments $K_{max}$.

3. The method of claim 2 wherein said minimum number of segments $K_{min}$ is determined by using a convex hull method on a loudness function derived from said speech.

4. The method of claim 3 wherein said maximum number of segments $K_{max}$ is determined by a spectral variation function formed of the Euclidian norm of the delta cepstral coefficient.

5. The method of claim 4 wherein the spectral variation function is represented by:

$$SVF_{\Delta cep}(n) = \sum_{m=1}^{p} [\Delta c_n(m)]^2$$

wherein $\Delta c_n$ is the delta cepstral coefficient of the $m^{th}$ cepstral coefficient at the time frame n and p is the order of the cepstral coefficient vector.

6. The method of claim 5 wherein said minimum number of segments $K_{min}$ and said maximum number of segments $K_{max}$ is determined from a subword histogram of a predetermined phonetically labeled database.

7. The method of claim 1 wherein said step of dynamically determining locations of boundaries is determined with modified level building dynamic programming with the steps of:

generating reference vectors related to subword segments dynamically during said level building;

calculating the accumulated distance based on said reference vectors in a segment for frames i through n of said speech for a plurality of levels representing the number of boundaries corresponding to said estimate of said number of segments K; and determining a backtrack pointer for each of said frames for each said level corresponding to a best path through said frames between adjacent levels.

8. The method of claim 7 wherein said optimality criterion $Q_k$ is determined from a normal decomposition method as the summation of a plurality of normal distribution of the form:

$$p(x) = \sum_{i=1}^{i=K} P_i p_i(x)$$

wherein $P_i$ is the prior probability and $P_i(x)$ defined as $\mu(X,M,\Sigma_i)$ is normal with expected vector $M_i$ and covariance matrix $\Sigma_i$ and a log likelihood criteria of the form $$Q_k = \sum_{j=1}^{j=N} \ln p(x_j).$$

9. A system for segmenting speech without knowledge of linguistic information into a plurality of segments comprising:

means for estimating a range of a number of said segments in said speech;

means for dynamically determining locations of boundaries for each estimate of a number of said segments K within said range of said number of said segments;

means for determining an optimality criterion $Q_k$ for each of said estimate of said number of segments K from said location of said boundaries;

means for determining an optimal number of segments $K_0$ in said speech from said optimality criterion $Q_k$;

means for segmenting said speech into said optimal number of segments $K_0$;

means for storing said optimal number of segments $K_0$; and means for modeling said speech based on said optimal number of segments $K_0$.

10. The system of claim 9 wherein said range of said number of segments is between a minimum number of segments $K_{min}$ and a maximum number of segments $K_{max}$.

11. The system of claim 10 wherein said minimum number of segments $K_{min}$ is determined by using a convex hull method on a loudness function derived from said speech.

12. The system of claim 11 wherein said maximum number of segments $K_{max}$ is determined by a spectral variation function formed of the Euclidian norm of the delta cepstral coefficient.

13. The system of claim 12 wherein the spectral variation function is represented by:

$$SVF_{\Delta cep}(n) = \sum_{m=1}^{p} [\Delta c_n(m)]^2$$

wherein $\Delta c_n$ is the delta cepstral coefficient of the $m^{th}$ cepstral coefficient at the time frame n and p is the order of the cepstral coefficient vector.

14. The system of claim 10 wherein said means for dynamically determining locations of boundaries comprises:

means for generating reference vectors related to subword segments dynamically during said level building;

means for calculating the accumulated distance based on said reference vectors in a segments for frames i through n of said speech for a plurality of levels representing the number of boundaries corresponding to said estimate of said number of segments K; and means for determining a backtrack pointer for each of said frames for each said level corresponding to a best path through said speech frames between adjacent levels.

15. The system of claim 14 wherein said optimality criterion $Q_k$ is determined as the summation of a plurality of normal distribution of the form:

$$p(x) = \sum_{i=1}^{i=K} P_i p_i(x)$$

wherein $P_i$ is the prior probability and $P_i(x)$ defined as $\mu(X,M,\Sigma_i)$ is normal with expected vector $M_i$ and covariance matrix $\Sigma$ and a log likelihood criteria of the form $$Q_k = \sum_{j=1}^{j=N} \ln p(x_j).$$

16. A system for speaker verification without knowledge of linguistic information for speech spoken by said speaker comprising:

means for extracting at least one spectral feature vector from first speech;

means for segmenting said extracted feature vector by estimating a range of a number of said segments in said extracted feature vector;

means for dynamically determining locations of boundaries for each estimate of numbers of said segments K within said range of said number of said segments;

means for determining an optimality criterion $Q_k$ for each of said estimate of said number of segments K from said location of said boundaries for determining an optimal number of segments $K_0$ in said first speech from said optimal criterion $Q_k$;

means for segmenting said first speech into said optimal number of segments;

means for storing said boundaries and said optimal number of segments as segmentation parameters;

means for determining a first subword model from said segmentation parameters of said first speech;

means for determining a second subword model from said optimal number of segments;

means for storing said first subword model and said second subword model;

means for extracting at least one second feature vector from a second speech sample;

means for segmenting said second feature vector into said optimal number of segments using said stored segmentation parameters;

means for recognizing the segmented second speech sample from said stored first subword model and said second subword model to produce recognized output; and means for determining from said recognized output whether to accept or reject said speaker.

17. The system of claim 16 wherein said means for determining from said recognized output whether to accept or reject said speaker further comprises:

determining a first score from said first subword model;

determining a second score from said second subword model; and combining said first and second scores.

18. The system of claim 17 wherein said means for recognizing further comprises:

determining a third score for said second speech sample from said stored first subword model;

determining a fourth score for said second speech sample from said stored second subword model;

combining said third and fourth scores; and determining the similarity of said combined first and second score with said combined third and fourth score.

19. The system of claim 16 wherein the maximum number of segments $K_{max}$ of said range of said number of segments is determined by a spectral variation formed of the Euclidian norm of the delta cepstral cofficient wherein the spectral variation function is represented by:

$$SVF_{\Delta cep}(n) = \sum_{m=1}^{p} [\Delta c_n(m)]^2$$

wherein $\Delta c_n$ is the delta cepstral coefficient of the $m^{th}$ cepstral coefficient at the time frame n and p is the order of the cepstral coefficient vector.

20. The system of claim 19 wherein said means for dynamically determining locations of boundaries comprises:

means for generating reference vectors related to subword segments dynamically during said level building;

means for calculating the accumulated distance based on said reference vectors in a segments for frames i through n of said speech for a plurality of levels representing the number of boundaries corresponding to said estimate of said number of segments K; and means for determining a backtrack pointer for each of said frames for each said level corresponding to a best path through said speech frames between adjacent levels.

21. The system of claim 20 wherein said optimality criterion $Q_k$ is determined as the summation of a plurality of normal distribution of the form:

$$p(x) = \sum_{i=1}^{i=K} P_i p_i(x)$$

wherein $P_i$ is the prior probability and $P_i(x)$ defined as $\mu(X,M,\Sigma_i)$ is normal with expected vector $M_i$ and covariance matrix $\Sigma_i$ and a log likelihood criteria of the form $$Q_k = \sum_{j=1}^{j=N} \ln p(x_j).$$

22. A system for speech recognition of user defined vocabulary words comprising:

means for estimating a range of a number of said subwords in a first vocabulary word;

means for dynamically determining locations of boundaries for each estimate of a number of said subwords within said range of said number of said subwords;

means for determining an optimality criterion $Q_k$ for each of said estimate of said number of subwords from said location of said boundaries;

means for determining an optimal number of subwords in said vocabulary word from said optimality criterion $Q_k$;

means for modeling said subwords with a classifier to determine a plurality of word models for said vocabulary word;

means for storing said word models; and means for recognizing a second vocabulary word from said stored word models.

23. The system of claim 22 wherein said means for recognizing determines a score for each of said word models and further comprising:

means for determining a maximum value of said scores from said word models; and means for assigning a recognized word label to said subwords corresponding to said word model having said maximum value.

24. A system for recognizing a language comprising:

means for estimating a range of a number of said subwords in first speech of said language;

means for dynamically determining locations of boundaries for each estimate of a number of said subwords within said range of said number of subwords;

means for determining an optimal criterion $Q_k$ for each of said estimate of said number of subwords from said location of said boundaries;

means for determining an optimal number of subwords in said first speech from said optimality criterion $Q_k$;

means for modeling said subwords with a classifier to determine a language model;

means for storing said language model; and means for recognizing a language of a second speech sample from said stored language model.

25. The system of claim 24 wherein said means for recognizing determines a score for each of a plurality of said language models and further comprising:

means for determining a maximum value of said scores from said language models; and means for assigning a recognized language label to said subwords corresponding to said language model having said maximum value.

26. A system for phonetic transcription comprising:

means for estimating a range of a number of said subwords in a first speech sample;

means for dynamically determining locations of boundaries for each estimate of a number of said subwords within said range of said number of said subwords;

means for determining an optimal criterion $Q_k$ for each of said estimate of said number of subwords from said location of said boundaries;

means for determining an optimal number of subwords in said speech from said optimality criterion $Q_k$; and means for storing said boundary locations, wherein said boundary locations are used in subsequent phonetic transcription.

* * * * *